BINARY-DECIMAL PULSE ENCODER

INVENTOR
WILMER C. ANDERSON
by Louis Altman
ATTY.

INVENTOR
WILMER C. ANDERSON
by Louis Altman
ATTY.

INVENTOR
WILMER C. ANDERSON
by Louis Altman
ATTY.

United States Patent Office 3,425,053

Patented Jan. 28, 1969

3,425,053

BINARY-DECIMAL PULSE ENCODER

Wilmer C. Anderson, Greenwich, Conn., assignor to General Time Corporation, New York, N.Y., a corporation of Delaware Filed Mar. 29, 1965, Ser. No. 443,387

U.S. Cl. 340—347 8 Claims

Int. Cl. H04l *3/00;* H03k *13/00*

ABSTRACT OF THE DISCLOSURE

A binary-decimal pulse encoder utilizing a plurality of monostable magnetic devices and means for presetting each of them to produce either of two pulses whose widths are indicative of binary "0" and binary "1" respectively, and means responsive to a control input pulse for sequentially energizing the monostable magnetic devices to produce a train of binary-decimal coded pulses.

A principal object of the present invention is to provide a new and improved binary-decimal pulse encoder. Another object is to provide such an encoder which produces a binary-decimal pulse width-coded output. A related object is to provide such an encoder which employs monostable magnetic switching devices.

A more specific object of the present invention is to provide a new and improved binary-decimal pulse encoder which produces a train of pulses having widths representative of each successive binary-digit. More specifically, it is an object to provide such an encoder wherein a binary "0" is represented by a prescribed polarity pulse having a first time period and a binary "1" is represented by a same polarity pulse having a different time period.

Another object of the present invention is to provide a new and improved binary-decimal pulse encoder which responds to input pulses notwithstanding the varying volt-second content thereof. A further object is to provide a new and improved binary-decimal pulse encoder which minimizes the drain upon the associated power supply.

Finally, an object of the present invention is to provide a new and improved binary-decimal pulse encoder which possesses advantages not found in conventional devices of this type but which is inherently simple, susceptible to compact or miniaturized circuit techniques and which may be constructed at low cost as a "building block" for use in complex apparatus.

Other objects and advantages of the invention will become apparent upon reading the attached detailed description and upon reference to the drawings, in which.

Figure 1:
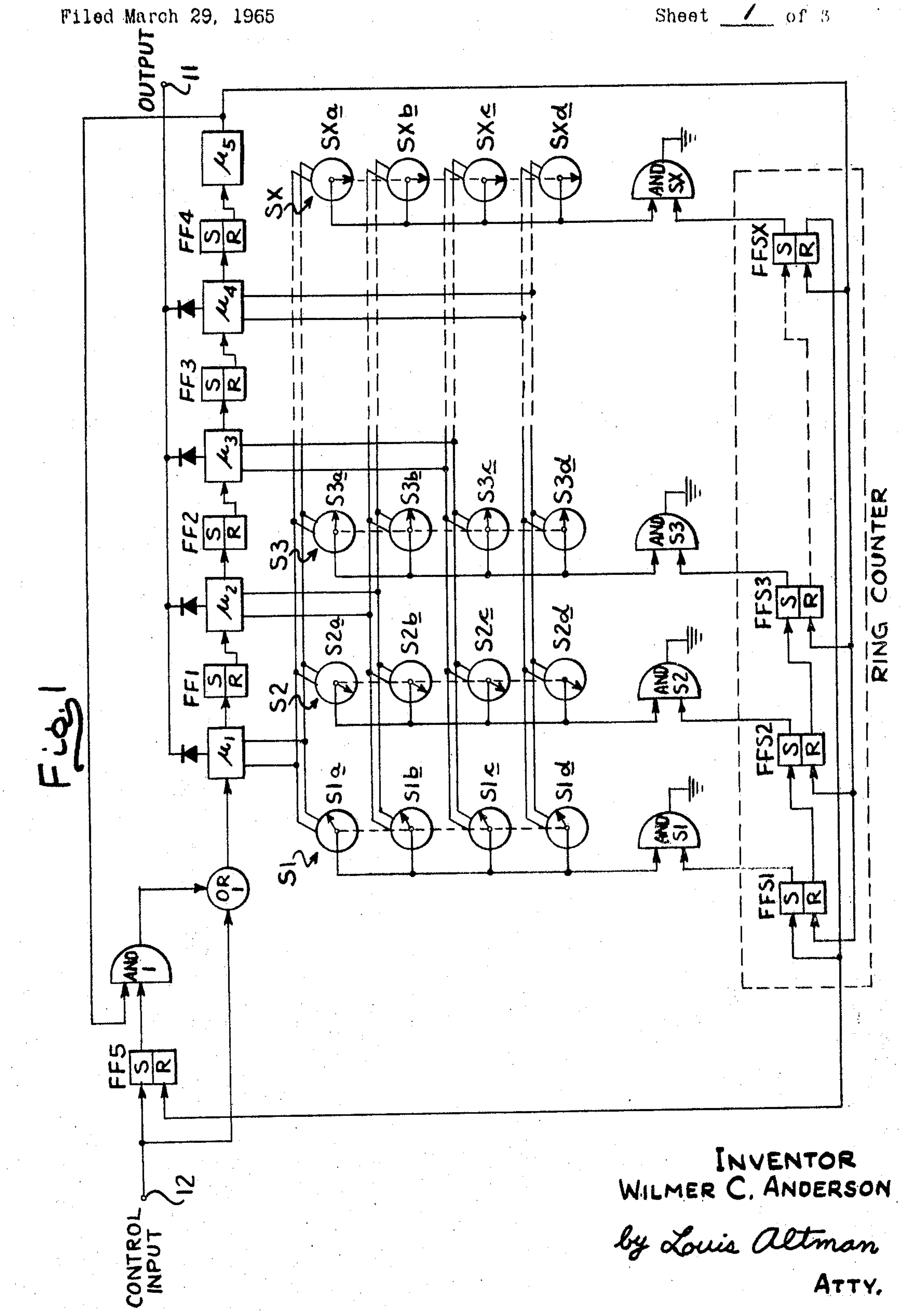
FIGURE 1 is a block diagram showing the preferred form of a binary-decimal pulse encoder constructed in accordance with the teachings of the present invention.

While the invention has been described in connection with a certain preferred embodiment, it is to be understood that the invention is not to be limited to the disclosed embodiment but, on the contrary, the invention is intended to cover the various modifications and equivalent arrangements included within the spirit and scope of the appended claims.

In the drawings, flip-flops, AND gates and OR gates have been symbolically illustrated. Since these elements are commonly utilized in the electronics art, the details thereof are not set forth. However, a brief description of the operation of these elements may be helpful in understanding the operation of the present invention.

The flip-flops are illustrated as rectangles having two sections, one being marked S and the other being marked R. Inputs to the flip-flops are connected to the left-hand sides thereof and outputs are connected to the right-hand sides thereof. When an input signal or pulse is applied to the S section of a flip-flop, the flip-flop is set and a desired output signal is provided at the S output terminal only. When an input signal or pulse is applied to the R section of a flip-flop, the flip-flop is reset and a desired output signal is provided at the R output terminal only. When an input signal or pulse is applied to an input connected to the junction of the S and R sections of a flip-flop, the flip-flop is set in response to a first input signal or pulse and is reset in response to the next-succeeding input signal or pulse, the switching action being continuous as input pulses are continuously applied thereto.

The AND gates have a control input terminal, an input terminal and an output terminal and are so designed that the input signals are transmitted to the output terminal only when input signals are applied to both the input terminal and the control input terminal, i.e., the gate is open. A typical, usable circuit is shown in General Electric Transistor Manual, fifth ed. (1960), Fig. 12.7 and Fig. 12.8(A). In the circuit shown in Fig. 12.7 terminal A is connected to a Ring Counter Flip Flop, FFSI–FFSX, of application FIG. 1; terminals B and C are not used; and the terminal marked +20V is connected to a selector switch SI–SX, in application FIG. 1. The OR gates have input terminals and an output terminal and are so designed that an output is provided at the output terminal when an input is applied to at least one input terminal.

Turning now to the drawings, there is shown in FIG. 1 a block diagram of a binary-decimal pulse encoder constructed in accordance with the teachings of the present invention which has low power drain characteristics. More specifically, a binary-decimal pulse encoder is shown which, as will be apparent, employs monostable magnetic devices for causing a train of output pulses to be produced that are representative of succeeding binary-digits wherein a binary "0" is represented by a prescribed polarity pulse having a first time period and a binary "1" is represented by a same polarity pulse having a different time period.

The binary-decimal pulse encoder includes a series of monostable magnetic switching devices *u–u*. The monostable magnetic switching devices *u–u* are provided to produce a train of pulses at an output 11, when sequentially energized, which are representative of the succeeding binary-digits of a binary-decimal coded number corresponding to a desired decimal number. The monostable magnetic device $u_5$ is provided to condition the pulse encoder for a series of operations whereby a train of pulses may be produced at the output 11 which is representative of a series of binary-decimal coded numbers corresponding to a series of decimal numbers.

For the purpose of causing the monostable magnetic switching devices $u_1$–$u_5$ to be sequentially energized, bistable flip-flops FF1–FF4 are interposed between succeeding ones of the monostable magnetic devices. When an input pulse or signal is applied to the first magnetic device $u_1$, the device is energized whereby it is driven from a first magnetic state to a second magnetic state. A prescribed time period thereafter, the magnetic device $u_1$ automatically resets itself to the first magnetic state whereat it remains until it is subsequently energized by an input signal or pulse. During this period of operation of the magnetic device $u_1$, a desired pulse is produced at the output 11 which is representative of a binary "0" or a binary "1." Additionally, as will be apparent, a signal is transmitted from the magnetic device $u_1$ to the flip-flop FF1 which causes the flip-flop to be reset when the magnetic device is reset so that a desired input pulse or signal is transmitted to the second monostable magnetic switching device $u_2$ whereby the magnetic device is energized and is caused to pass through a corresponding cycle of operation. In like manner, a desired output pulse is produced at the output 11 during operation of the magnetic device $u_2$ and subsequent to the resetting thereof, the flip-flop FF2 is reset to cause the monostable magnetic switching device $u_3$ to be energized. It follows that the monostable magnetic switching devices $u_1$–$u_5$ are sequentially energized and desired output pulses are sequentially produced at the output 11 by the magnetic devices $u_1$–$u_4$.

For the purpose of presetting the magnetic devices $u_1$–$u_4$ to produce trains of output pulses in binary-decimal coded form which are representative of desired decimal digits, a plurality of gang switch arrangements S1–SX have been provided. As may be seen, each of the gang switch arrangements includes four switching devices and each switching device is independently associated with one of the monostable magnetic devices $u_1$–$u_4$. The gang switch arrangements S1–SX are sequentially associated with the monostable magnetic devices $u_1$–$u_4$ by a ring counter which includes a plurality of flip-flops FFS1–FFSX which correspond in number to the gang switch arrangements. When the associated one of the flip-flops FFS1–FFSX is in the set condition, one of the gang switch arrangements S1–SX is energized through an associated AND gate ANDS1–ANDSX to condition the monostable magnetic devices $u_1$–$u_4$ to produce a train of output pulses in binary-decimal coded form representative of a desired decimal digit determined by the presetting of the energized gang switch arrangement. As will be readily apparent, the ring counter causes the gang switch arrangements S1–SX to be sequentially energized so that trains of output pulses representative of a series of decimal digits are sequentially produced at the output 11.

In order to provide a better understanding of the present invention as thus far described, a brief description of the operation thereof may be helpful. For this purpose, let it be assumed that the gang switch arrangements S1–SX have been preset to condition the monostable magnetic devices $u_1$–$u_4$ to produce desired trains of output pulses representative of desired decimal digits. Additionally, let it be assumed that the flip-flop FFS1 in the ring counter is in the set condition, whereas the remaining flip-flops FFS2–FFSX are in the reset conditions.

In response to the application of a control input signal or pulse to a control input terminal 12 of the pulse encoder, a flip-flop FF5 is driven to the set condition whereby a desired output signal is produced at the "S" output thereof which is transmitted to a control input terminal of a gate AND1 and which causes the gate to be conditioned for the subsequent passage of a signal applied to its other input terminal. The control input signal or pulse received at the input terminal 12 also passes through a gate OR1 to the input of the first monostable magnetic switching device $u_1$. Since the flip-flop FFS1 is assumed to be in the set condition, it will be readily apparent that the gang switch arrangement S1 is effectively associated with the magnetic devices $u_1$–$u_4$ to condition these magnetic devices for the production of a desired train of binary output pulses representative of a desired decimal digit. In response to the application of the control input pulse or signal to the magnetic device $u_1$, the magnetic device $u_1$ is energized and passes through a cycle of operation as previously described so that a first binary digit pulse is produced at the output 11 which is representative of either a binary "0" or a binary "1," dependent upon the presetting of the switch S1*a* in the gang switch arrangement S1. Subsequent to the completion of the cycle of operation of the magnetic device $u_1$, the flip-flop FF1 is reset causing the magnetic device $u_2$ to be energized so that it then passes through a cycle of operation. In response thereto, a second binary digit pulse is produced at the output 11 which represents a binary "0" or a binary "1," dependent upon the presetting of the switch S1*b*. Thereafter, the magnetic devices $u_3$ and $u_4$ are sequentially energized to cause third and fourth binary digit pulses to be produced at the output 11, each representative of a binary "0" or binary "1," depending upon the presetting of the switches S1*c* and S1*d*. Consequently, a train of binary-decimal coded output pulses is produced at the output 11 which represents a decimal digit determined by the presetting of the gang switch arrangement S1.

When the monostable magnetic device $u_4$ completes its cycle of operation, the flip-flop FF4 is reset causing the monostable magnetic switching device $u_5$ to be energized so that it passes through a cycle of operation and an output pulse is produced. The output pulse produced by the magnetic device $u_5$ is transmitted to the "R" inputs of the flip-flops FFS1–FFSX. Since only the flip-flop FFS1 was previously in the set condition, only the flip-flop FFS1 is reset. As a result, the gang switch arrangement S1 is no longer effectively associated with the magnetic devices $u_1$–$u_4$. Additionally a desired output signal is produced at the "R" output of the flip-flop FFS1 which is transmitted to the "S" input of the flip-flop FFS2 causing the flip-flop FFS2 to be set. At this time, the gang switch arrangement S2 is effectively associated with the magnetic devices $u_1$–$u_4$ to condition these magnetic devices for the production of a train of binary-decimal coded output pulses representative of a decimal digit determined by the presetting of the gang switch arrangement S2, The output pulse produced by the magnetic device $u_5$ is also transmitted through the gate AND1 and the gate OR1 to the input of the magnetic device $u_1$. It follows that the magnetic devices $u_1$–$u_5$ are again sequentially energized as described hereinabove. Thus, a train of binary-decimal coded output pulses is produced at the output 11 which is representative of the decimal digit determined by the presetting of the gang switch arrangement S2.

It will be readily apparent that, as operation of the encoder proceeds, succeeding ones of the flip-flop FFS3–FFSX are successively set to associate succeeding ones of the gang switch arrangements S3–SX with the monostable magnetic switching devices $u_1$–$u_4$ whereby trains of binary-decimal coded output pulses are produced at the output 11 which are representative of succeeding decimal digits determined by the presetting of the gang switch arrangements S3–SX. When the magnetic device $u_5$ is energized to produce an output pulse during the time period when the gang switch arrangement SX is effectively associated with the magnetic devices $u_1$–$u_4$, the pulse is transmitted to the "R" input of the flip-flop FFSX causing the flip-flop to be reset. When the flip-flop FFSX is reset, the flip-flop FFS1 is set causing the gang switch arrangements S1 to be effectively associated with the magnetic devices $u_1$–$u_4$. Additionally, when the flip-flop FFSX is reset, a signal is transmitted from the "R" output thereof to the "R" input of the flip-flop FF5 causing the flip-flop FF5 to be reset whereby the gate AND1 is no longer conditioned for the passage of a pulse. Consequently, operation of the binary-decimal pulse encoder ceases and the encoder is conditioned for a subsequent cycle of operation in response to the application of a control input pulse to the control input terminal 12.

Figure 2:
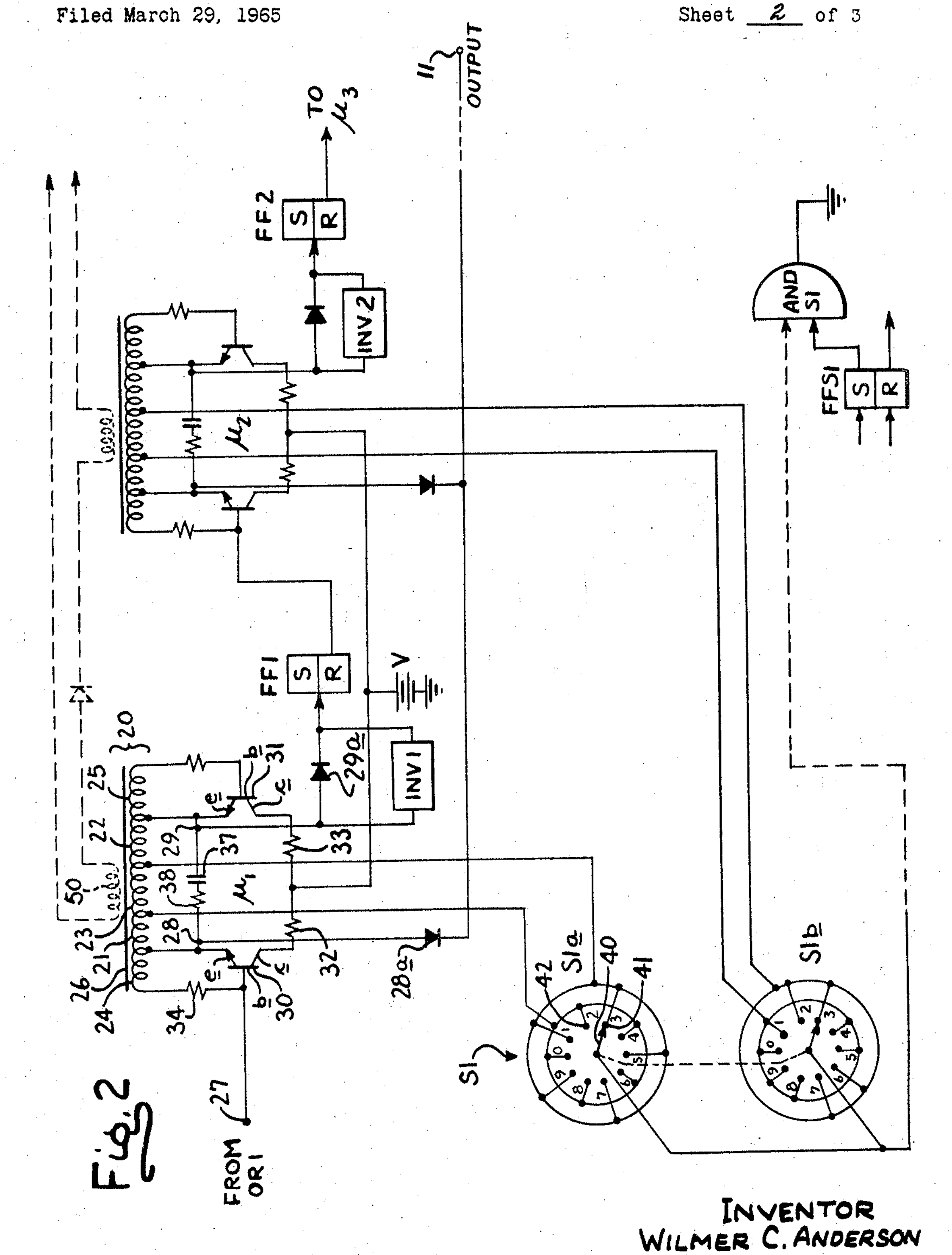
FIG. 2 is a schematic diagram of a portion of the binary-decimal pulse encoder shown in block form in FIG. 1.

Referring now to FIG. 2, a portion of the pulse encoder shown in block form in FIG. 1 is disclosed in schematic form. As may be seen, only two of the monostable magnetic switching devices $u_1$ and $u_2$ and two of the switching devices S1*a* and S1*b* in the gang switch arrangement S1 are shown in the schematic arrangement. However, it will be readily apparent that the remaining components in the pulse encoder correspond to those disclosed in FIG. 2. Additionally, only the magnetic device $u_1$ will be described in detail since the other magnetic devices are identical thereto.

In keeping with the present invention, the monostable magnetic device $u_1$ is provided with two conducting sides which are normally quiescent so that no power is drawn thereby and which are successively rendered conductive in response to the application of an input pulse thereto so that a prescribed polarity output pulse having a predetermined volt-second content is produced thereby. The magnetic device $u_1$ includes a saturable transformer 20 having a pair of main energizing windings 21 and 22, an auxiliary energizing winding 23 and a pair of auxiliary input-feedback windings 24 and 25 all wound on a core 26. Additionally, the magnetic device has an input terminal 27 which is connected to the gate OR1 (FIG. 1) and has a pair of output terminals 28 and 29. The output terminal 28 is connected to the output 11 through a diode 28*a*, whereas the output terminal 29 is connected to the common input of the flip-flop FF1 through a buffer diode 29*a* and through an inverter INV1. The core is formed of a readily saturable magnetic material preferably having a generally rectangular hysteresis loop, such material being commercially sold by G. L. Electronics Company under the name "Orthonik" type P1040, though the invention is intended to cover the use of any saturable material. For driving the core 26 into its opposite conditions of saturation which may, for convenience, be termed "positive" and "negative" saturation, the energizing windings 21–23 are energized by switch devices 30 and 31, illustrated as transistors. Each of the transistors includes a base, an emitter and a collector, which are respectively designated as *b*, *e* and *c*.

Winding 21, or the combination of windings 21 and 23, is effectively connected to the emitter of the transistor 30, and the collector of the transistor 30 is connected to the positive terminal of a voltage source, designated as V, through a resistor 32. Likewise, the winding 22, or the combination of the windings 22 and 23, is effectively connected to the emitter of transistor 31, and the collector of the transistor 31 is connected to the positive terminal of the source V through a resistor 33. In the illustrated embodiment, the numbers of turns of the energizing windings 21 and 22 are assumed to be equal. The purpose of the auxiliary energizing winding 23 will become apparent as the description proceeds. The auxiliary input-feedback windings 24 and 25 are employed to excite the base or control terminals of the transistors 30 and 31 and are, respectively, connected to the base terminals through resistors 34 and 35, the voltage developed across an auxiliary input-feedback winding and the associated resistor determining the bias on the base terminal of the associated transistor.

The output terminals 28 and 29 are respectively connected to the emitters of the transistors 30 and 31. As the transistors 30 and 31 are rendered conductive and nonconductive, the potentials at the emitters thereof vary so that positive and negative going output pulses or signals are produced at the output terminals 28 and 29, as will become apparent. For the purpose of improving the form of the output pulses produced at the output terminals 28 and 29, a capacitor 37 and a resistor 38 are connected in series between the emitters of the transistors 30 and 31. The series connection of the capacitor 37 and the resistor 38 also prevents a "free-running" condition of the monostable device, thereby aiding in the monostable operation thereof. The resistors 32 and 33 also aid in preventing a "free-running" condition of the monostable device.

In keeping with the present invention, means have been provided for varying the ampere-turns of the energizing windings associated with the transistors 30 and 31 so that a desired asymmetrical output wave is provided by the monostable device. In the present instance, the switch S1*a* is provided for associating the auxiliary energizing winding 23 with either the energizing winding 21 associated with the transistor 30 or the energizing winding 22 associated with the transistor 31. With the contact arm 40 of the switch S1*a* in engagement with the terminal 41 (designated with the numeral 3) as viewed in FIG. 2, the auxiliary energizing winding 23 is associated with the energizing winding 21. Thus, when the transistor 30 is rendered conductive, current flows through the collector-emitter circuit thereof, through the energizing windings 21 and 23, through terminal 41 and contact 40 of the switch S1*a* and through the gate ANDS1 to ground, provided the flip-flop FFS1 is in the set condition. On the other hand, when the transistor 31 is rendered conductive, current flows through the collector emitter circuit thereof, through the energizing winding 22, through the terminal 41 and the contact 40 of the switch S1*a* and through the gate ANDS1 to ground, again provided that the flip-flop FFS1 is in the set condition. In the event the contact arm 40 of the switch S1*a* is moved into engagement with, for example, the contact 42 (designated with the numeral 2), the auxiliary energizing winding 23 is associated with the energizing winding 22 rather than with the energizing winding 21. Under these conditions, current flowing through the collector-emitter circuit of transistor 31 flows through energizing windings 22 and 23, whereas current flowing through the collector-emitter circuit of transistor 30 flows through energizing winding 21. Thus, depending upon the presetting of the contact arm 40 of the switch S1*a*, a greater number of energizing winding turns is associated with one of the transistors than is associated with the other transistor. Consequently, an asymmetrical output wave is produced by the magnetic device $u_1$ during a cycle of operation which is representative of either a binary "0" or a binary "1."

Figure 3:
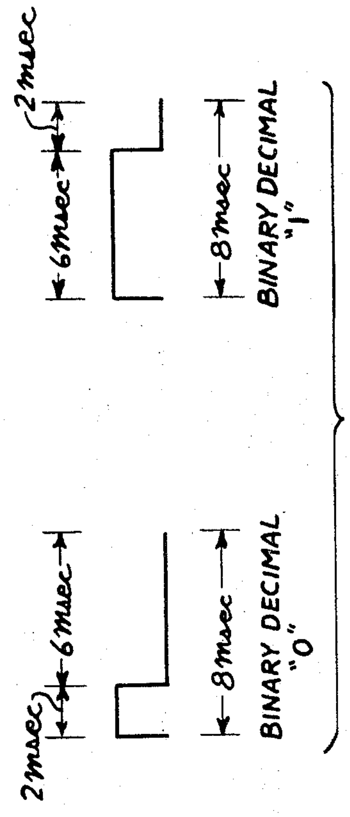
FIG. 3 illustrates the relationship between pulses representative of a binary "0" and a binary "1"

For the purpose of this description, it will be assumed that a pulse representative of a binary "0" (see FIG. 3) is produced at the output terminal 28 when the auxiliary energizing winding is associated with the transistor 31. Conversely, it will be assumed that a pulse representative of a binary "1" (FIG. 3) is produced at the output terminal 28 when the auxiliary energizing winding 23 is associated with the transistor 30. Assuming a binary-decimal cycle requires 8 milliseconds (msec) as shown in FIG. 3, a binary "0" is represented by a 2 msec. positive going portion followed by a 6 msec. negative going portion, whereas a binary "1" is represented by a 6 msec. positive going portion followed by a 2 msec. negative going portion.

In keeping with this aspect of the present invention, the switch S1*a* is provided with ten contacts sequentially numbered from 0–9 and the contacts are selectively associated with the magnetic device $u_1$ by presetting of the contact arm 40 so that the auxiliary energizing winding 23 is selectively associated with the transistors 30 and 31. Additionally, since the switch arrangement S1 is a gang switch arrangement, the contact arms of all the switches S1*a*–S1*d* engage correspondingly numbered contacts. If, for example, the gang switch arrangement S1 is preset so that a binary-decimal coded output representative of the decimal digit three is produced, the contact arm 40 engages the number three contact terminal 41 so that the auxiliary energizing winding 23 is associated with the transistor 30. As a result, an output pulse representative of a binary 1 is produced at the output 28 by the magnetic device $u_1$ and is transmitted to the output 11.

A brief description of the operation of the magnetic device $u_1$ as shown in FIG. 2 may be helpful in providing a better understanding of the present invention. For this purpose, let it be assumed that the flip-flop FFS1 is in the set condition and an input pulse is applied to the input terminal 27. In response thereto, the transistor 30 is rendered conductive so that current flows through the collector-emitter circuit thereof, through the energizing windings 21 and 23, through terminal 41 and the contact arm 40 of the switch S1$a$ and through the gate ANDS1 since the flip-flop FFS1 is in the set condition. Conduction in transistor 30 induces a voltage in the associated auxiliary input-feedback winding 24 which is in a direction to bias the transistor so that it tends to conduct more heavily. The current flowing through the energizing windings 21 and 23 causes the core 26 to be driven toward a primary state of saturation, i.e., positive saturation. When positive saturation is attained and slightly exceeded, the rate of change of flux in the core 26 decreases, hence the voltage decreases. By transformer action, the bias voltage on the transistor 30 also diminishes, hence the current in this transistor decreases so that the transistor becomes nonconducting. The decaying current induces a voltage across the auxiliary input-feedback winding 25 of the transistor 31 in a direction such that the transistor 31 is rendered conductive. Conduction in transistor 31 begins and is in a direction to induce a forward bias in winding 25 so that this transistor conducts current more heavily causing the core to be driven to the condition of opposite saturation, i.e., negative saturation. When negative saturation is reached and slightly exceeded, the resulting reduction in current reduces the bias of the then-conducting transistor 31 and induces a voltage spike in the auxiliary input-feedback winding 24. In the absence of means for preventing "free-running" operation of the monostable device, such a voltage spike tends to induce oscillation since it may be of sufficient amplitude to trigger the previously nonconducting transistor 30 whereby reversing of core saturation would result. However, the capacitor 37 absorbs or integrates the voltage spike and the resistor 38 limits the current flow in response to the voltage spike so that the affect of the voltage spike is limited and conduction of the transistor 30 is not initiated. The resistor 32 also aids in preventing conduction of the transistor 30 from being initiated by limiting the current flow. Consequently, at this time, the magnetic device $u_1$ returns to a quiescent state wherein both transistors 30 and 31 are nonconductive and no power is thereby drawn from the source V.

Thus, a monostable magnetic device has been provided for causing a desired pulse to be transmitted to the output 11. During a cycle of operation of the magnetic device $u_1$ when the auxiliary energizing winding 23 is associated with the transistor 30, the transistor 30 is rendered conductive a shorter period of time than transistor 31 to cause saturation to be attained in the core 26. This is true since a greater number of energizing winding turns are associated with transistor 30 than are associated with transistor 31. Consequently, a pulse representative of a binary "0," as shown in FIG. 3, is produced at the output terminal 28. On the other hand, when the auxiliary winding 23 is associated with the transistor 31, the transistor 31 conducts for a shorter period of time than transistor 30 to cause saturation to be attained in the core 26. Thus, a pulse representative of a binary "1," as shown in FIG. 3, is produced at the output terminal 28.

Figure 5:
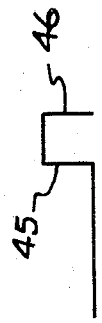
FIG. 5 illustrates a pulse produced by a stage of the encoder in FIGS. 1 and 2 which causes the next-succeeding stage to be energized.

As previously mentioned, operation of the flip-flop FF1 and thus energization of the next-succeeding magnetic device $u_2$ are controlled by an output produced by the magnetic device $u_1$. In the exemplary arrangement they are controlled by an output produced at the output terminal 29 of the magnetic device $u_1$. With the switch S1$a$ preset as shown in FIG. 2, an output wave corresponding to that shown in FIG. 5 is produced at the output terminal 29 which is the inverse of the output wave produced at output terminal 28. As may be seen, the output terminal 29 is connected to the common input of the flip-flop FF1 through the buffer diode 29$a$ and is also connected thereto through an inverter INV1. The positive going edge 45 of the output wave produced at terminal 29 passes through the diode 29$a$ and causes the flip-flop FF1 to be set. The negative going edge 46 of the output wave produced at terminal 29 is inverted by the inverter INV1 so that a positive going signal is thereby applied to the common input of the flip-flop FF1 whereby the flip-flop is reset concurrent with the completion of the production of an output signal by the magnetic device $u_1$. The buffer diode 29$a$ prevents the signal produced by the inverter INV1 from being transmitted back into the magnetic device $u_1$ and thereby prevents undesired operation thereof. When the flip-flop FF1 is reset, a desired output signal is produced at the "R" output thereof which is transmitted to the input of the magnetic device $u_2$ initiating a cycle of operation thereof. Thus, subsequent to the completion of a cycle of operation of the magnetic device $u_1$, a cycle of operation of the magnetic device $u_2$ is initiated.

For the purpose of allowing all the magnetic devices $u_1$–$u_5$ to be reset to desired initial conditions, auxiliary resetting windings, corresponding to winding 50 for the magnetic device $u_1$, may be associated with the cores of the magnetic devices and a resetting signal may be transmitted through a series arrangement of such resetting windings to cause all of the cores to be placed in desired initial conditions.

Figure 4:
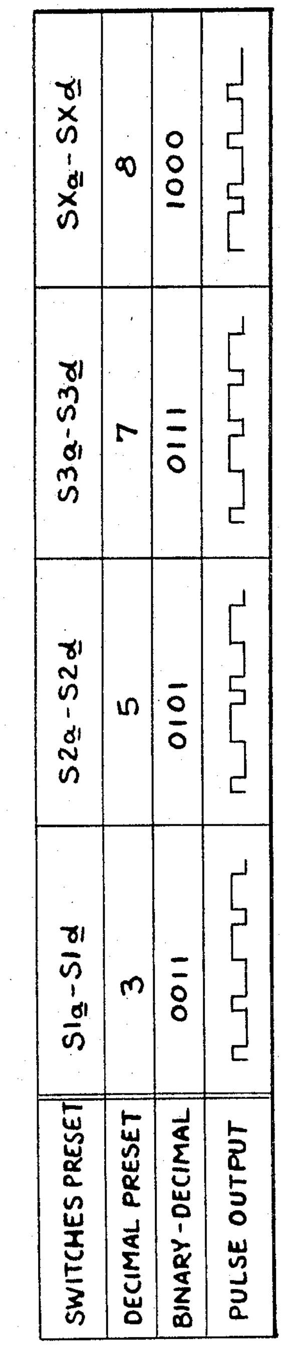
FIG. 4 illustrates the output pulses produced by the encoder shown in FIG. 1 for specific setting of the associated control switches.

Referring to FIG. 4, the binary-decimal pulse outputs for a typical presetting of the switches S1$a$–S1$d$, SX$a$–SX$d$ is shown, wherein the switches S1$a$–S1$d$, SX$a$–SX$d$ are, respectively, preset to the decimal numbers 3, 5, 7 and 8. As will be readily apparent, the binary-decimal pulse outputs for these decimal numbers will be sequentially produced at the output 11 during a typical operating cycle.

I claim as my invention:

1. In a binary-decimal pulse encoder, the combination which comprises, a plurality of monostable magnetic devices each presettable to produce an output pulse having either of two pulse widths representative of a binary "0" or a binary "1" when energized, a plurality of identical means for presetting the monostable magnetic devices to produce binary-decimal coded output pulses representative of a desired decimal digit, and means including a single control input line for sequentially energizing the monostable magnetic devices so that a train of binary-decimal coded output pulses is produced which is representative of the desired decimal digit.

2. In a binary-decimal pulse encoder, the combination which comprises, a plurality of monostable magnetic devices each having a pair of energizing windings, means associated with each magnetic device for varying the ampere-turns of the windings of the magnetic device with respect to each other so that a desired asymmetrical relationship exists therebetween and so that the associated magnetic device is preset to produce a desired polarity output pulse having either of two pulse widths representative of a binary "0" or a binary "1" when energized, and means responsive to a control input pulse for sequentially energizing the monostable magnetic devices so that a train of binary-decimal coded output pulses is produced which is representative of a desired decimal digit.

3. In a binary-decimal pulse encoder, the combination which comprises, a plurality of monostable magnetic devices each having a pair of symmetrical energizing windings and an auxiliary energizing winding, means associated with each magnetic device for associating the auxiliary energizing winding with a selected one of the symmetrical energizing windings so that a desired asymmetrical relationship exists therebetween and the associated magnetic device is present to produce a desired polarity output pulse having either of two pulse widths representative of a binary "0" or a binary "1" when energized, and means responsive to a control input pulse for sequentially energizing the monostable magnetic devices so that a train of binary-decimal coded output pulses is produced which is representative of a desired decimal digit.

4. In a binary-decimal pulse encoder, the combination which comprises, a source of power, a series of monostable magnetic devices each including a core having a pair of energizing windings wound thereon and including a pair of switch devices for controlling the flow of current from the source through the energizing windings, means associated with each magnetic device for varying the ampere-turns of the energizing windings of the magnetic device with respect to each other so that a desired asymmetrical relationship exists therebetween and the associated magnetic device is preset to produce a desired polarity output pulse having either of two pulse widths representative of a binary "0" or a binary "1" when energized, and means responsive to a control input pulse for sequentially energizing the monostable magnetic devices so that a train of binary-decimal coded output pulses is produced which is representative of a desired decimal digit.

5. In a binary-decimal pulse encoder, the combination which comprises, a source of energizing power, a series of monostable magnetic devices each including a core having a pair of energizing windings wound thereon and including a pair of switch devices for controlling the flow of current from the source through the energizing windings, means associated with each magnetic device for varying the ampere-turns of the energizing windings of the magnetic device with respect to each other so that a desired asymmetrical relationship exists therebetween and the associated magnetic device is preset to produce a desired polarity output pulse having either of two pulse widths representative of a binary "0" or a binary "1" when energized, each magnetic device being so constructed that the switch devices are sequentially triggered to conduction subsequent to energization of the magnetic device, means responsive to an input control pulse for energizing the first magnetic device, means responsive to the completion of the sequential triggering of the switch devices in each magnetic device except the last magnetic device for energizing the next-succeeding magnetic device so that a train of binary-decimal pulses is produced which is representative of a desired decimal digit, and means responsive to completion of the sequential triggering of the switch devices in the last magnetic device for stopping the operation of the pulse encoder and conditioning the pulse encoder for a subsequent cycle of operation.

6. In a binary-decimal pulse encoder, the combination which comprises, a plurality of monostable magnetic devices each presettable to produce an output pulse having either of two pulse widths representative of a binary "0" or a binary "1" when energized, a plurality of means each for independently presetting the monostable magnetic devices to produce binary-decimal coded output pulses representative of a desired decimal digit when effectively associated therewith, and means responsive to an input control pulse for sequentially associating the presetting means with the magnetic devices and for sequentially energizing the magnetic devices during the time interval in which each presetting means is associated therewith so that trains of binary-decimal pulses are produced which represent desired decimal digits.

7. In a binary-decimal pulse encoder, the combination which comprises, a plurality of monostable magnetic devices each presettable to produce an output pulse having either of two pulse widths representative of a binary "0" or a binary "1" when energized, a plurality of means each for independently presetting the monostable magnetic devices to produce binary-decimal coded output pulses representative of a desired decimal digit when effectively associated therewith, means for causing a first one of the presetting means to be effectively associated with the magnetic devices, means responsive to a control input pulse for sequentially energizing the monostable magnetic devices so that a train of binary-decimal coded output pulses is produced which is representative of a desired decimal digit as determined by the first presetting means, means responsive to the completion of the production of a train of output pulses during the time period when any presetting means but the last presetting means is effectively associated with the magnetic devices for effectively associating the next-succeeding presetting means with the magnetic devices and for sequentially energizing the magnetic devices so that a train of binary-decimal coded output pulses representative of a desired decimal digit is produced during the time period when each presetting means is effectively associated with the magnetic devices, and means responsive to the completion of the production of a train of output pulses during the time period when the last presetting means is effectively associated with the magnetic devices for stopping the operation of the pulse encoder and for conditioning the pulse encoder for a subsequent cycle of operation.

8. In a binary-decimal pulse encoder, the combination which comprises, a plurality of monostable magnetic devices each presettable to produce an output pulse having either of two pulse widths representative of a binary "0" or a binary "1" when energized, a plurality of means each for independently presetting the monostable magnetic devices to produce binary-decimal coded output pulses representative of a desired decimal digit when effectively associated therewith, means including a ring counter for causing a first one of the presetting means to be effectively associated with the magnetic devices, means responsive to a control input pulse for sequentially energizing the monostable magnetic devices so that a train of binary-decimal coded output pulses is produced which is representative of a desired decimal digit as determined by the first presetting means, means including the ring counter responsive to the completion of the production of a train of output pulses during the time period when any presetting means but the last presetting means is effectively associated with the magnetic devices for effectively associating the next-succeeding presetting means with the magnetic devices and for sequentially energizing the magnetic devices so that a train of binary-decimal coded output pulses representative of a desired decimal digit is produced during the time period when each presetting means is effectively associated with the magnetic devices, and means responsive to the completion of the production of a train of output pulses during the time period when the last presetting means is effectively associated with the magnetic devices for stopping the operation of the pulse encoder and for conditioning the pulse encoder for a subsequent cycle of operation.

References Cited

UNITED STATES PATENTS

| | | | |
|---|---|---|---|
| 2,933,625 | 4/1960 | Townsend | 307—273 |
| 3,244,909 | 4/1966 | Henderson | 307—273 |
| 3,260,864 | 7/1966 | Nourney | 307—273 |
| 3,327,226 | 11/1964 | Nourney | 307—273 |

MAYNARD R. WILBUR, *Primary Examiner.*

GARY R. EDWARDS, *Assistant Examiner.*

U.S. Cl. X.R.

328—38; 235—155